United States Patent
Shine et al.

(10) Patent No.: US 10,508,733 B2
(45) Date of Patent: Dec. 17, 2019

(54) CONTROL SYSTEM FOR VEHICLE

(71) Applicant: TOYOTA JIDOSHA KABUSHIKI KAISHA, Toyota-shi, Aichi-ken (JP)

(72) Inventors: Kazumi Shine, Toyota (JP); Yusuke Nakade, Nagoya (JP); Taiyo Uejima, Toyota (JP); Hiroshi Shibata, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 752 days.

(21) Appl. No.: 15/127,327

(22) PCT Filed: Mar. 9, 2015

(86) PCT No.: PCT/IB2015/000290
§ 371 (c)(1),
(2) Date: Sep. 19, 2016

(87) PCT Pub. No.: WO2015/145229
PCT Pub. Date: Oct. 1, 2015

(65) Prior Publication Data
US 2017/0138464 A1 May 18, 2017

(30) Foreign Application Priority Data
Mar. 24, 2014 (JP) ................................ 2014-060882

(51) Int. Cl.
*F16H 59/10* (2006.01)
*F16H 59/02* (2006.01)
*F16H 61/16* (2006.01)

(52) U.S. Cl.
CPC ....... *F16H 59/105* (2013.01); *F16H 59/0204* (2013.01); *F16H 61/16* (2013.01); *F16H 2059/0295* (2013.01)

(58) Field of Classification Search
CPC ...... F16H 59/105; F16H 61/61; F16H 59/204; F16H 2059/0295
(Continued)

(56) References Cited

U.S. PATENT DOCUMENTS

2004/0259685 A1 12/2004 Inoue et al.
2010/0025680 A1* 2/2010 Shino ................. H01L 29/7869
257/43
(Continued)

FOREIGN PATENT DOCUMENTS

JP 2005-007993 A 1/2005
JP 2006-347313 A 12/2006
(Continued)

*Primary Examiner* — Jacob S. Scott
*Assistant Examiner* — Michael E Butler
(74) *Attorney, Agent, or Firm* — Oliff PLC

(57) ABSTRACT

An operator is a momentary operator. An electronic control unit is configured to when the operator does not pass through any one of traveling operation positions while the operator is operated from an initial position to an neutral operation position and then returned to the initial position, and when the operator is continuously held at the neutral operation position for a first predetermined time or longer, change a shift range of an automatic transmission to the neutral range, and when the operator passes through at least one of the traveling operation positions while the operator is operated from the initial position to the neutral operation position and then returned to the initial position, prohibit a change of the shift range to the neutral range even when the operator is continuously held at the neutral operation position for the first predetermined time or longer.

3 Claims, 12 Drawing Sheets

(58) Field of Classification Search
USPC .......................................................... 701/59
See application file for complete search history.

(56) References Cited

U.S. PATENT DOCUMENTS

| | | | | |
|---|---|---|---|---|
| 2010/0168956 | A1* | 7/2010 | Ueno .................... | F16H 59/105 |
| | | | | 701/29.2 |
| 2013/0063133 | A1* | 3/2013 | Iwata .................... | G01D 5/145 |
| | | | | 324/207.2 |
| 2013/0124023 | A1* | 5/2013 | Nabeshima .............. | B60L 3/08 |
| | | | | 701/22 |
| 2013/0332019 | A1* | 12/2013 | Goto ....................... | F16H 61/22 |
| | | | | 701/22 |
| 2014/0318294 | A1* | 10/2014 | Kannada ................. | F16H 61/32 |
| | | | | 74/473.12 |

FOREIGN PATENT DOCUMENTS

| | | | |
|---|---|---|---|
| JP | 2008-002561 | A | 1/2008 |
| JP | 2008-006982 | A | 1/2008 |
| JP | 2010-100193 | A | 5/2010 |
| JP | 2013-154700 | A | 8/2013 |
| JP | 2013-157700 | A | 8/2013 |

\* cited by examiner

US 10,508,733 B2

CONTROL SYSTEM FOR VEHICLE

BACKGROUND OF THE INVENTION

1. Field of the Invention

The invention relates to a control system for a vehicle, which electrically changes a shift range of an automatic transmission on the basis of an operation position in a momentary-type operation device.

2. Description of Related Art

There is well known a vehicle that employs a shift-by-wire (SBW) system. The shift-by-wire (SBW) system means a system of electrically changing a shift range of an automatic transmission on the basis of an operation position of an operator (for example, a shift lever or a switch) in an operation device that is artificially operated. In such a vehicle that employs the SBW system, a momentary-type operator may be used as the operator in the operation device. The momentary-type operator is returned to an initial position in a state where no external force is applied. Such an operation device is, for example, the SBW-system operation device described in Japanese Patent Application Publication No. 2006-347313 (JP 2006-347313 A). JP 2006-347313 A describes that, when the operator has been operated from the initial position to a reverse traveling (reverse) position via a neutral operation position and when a time of passage through (a holding time at) the neutral operation position is shorter than or equal to a predetermined time, the automatic transmission is changed into a reverse range without selecting a neutral range corresponding to the neutral operation position.

SUMMARY OF THE INVENTION

Incidentally, in the SBW-system operation device that uses the momentary operator, as described in JP 2006-347313 A, the shift range of the automatic transmission can be a forward traveling (drive, brake, or manual shift) range or the reverse range even in a state where the operator is placed at the initial position. At the time when the operator is operated from the initial position to another operation position via the neutral operation position, if the operator is held at the neutral operation position over the predetermined time, the shift range is once changed to the neutral range at that timing. After that, the shift range is changed to a shift range corresponding to the other operation position. Therefore, depending on the length of the predetermined time, there is a possibility that a torque (driving force) drop occurs against a driver's intention because of the temporarily set neutral range although the operator is intended to be operated to the other operation position. The above-described inconvenience is not publicly known.

The invention provides a control system for a vehicle, which is able to suppress a torque drop resulting from a change into a neutral range when an operation device includes a momentary-type operator that is operated from an initial position via a neutral operation position to any one of a plurality of traveling operation positions corresponding to a plurality of traveling ranges of an automatic transmission.

A first aspect of the invention provides a control system for a vehicle. The control system includes an automatic transmission, an operation device, and an electronic control unit. The operation device includes an operator. The operator is a momentary operator that is returned to an initial position in a state where no external force is applied. The operator is configured to be selectively operated by a driver from the initial position to any one of a plurality of traveling operation positions via a neutral operation position. The neutral operation position corresponds to a neutral range of the automatic transmission. The plurality of traveling operation positions correspond to a plurality of traveling ranges of the automatic transmission. The electronic control unit is configured to (1) change a shift range of the automatic transmission based on the initial position, the neutral operation position and the traveling operation positions, (2) when the operator is operated from the initial position to the neutral operation position and then returned to the initial position, change the shift range to the neutral range, (3) when the operator does not pass through any one of the traveling operation positions while (i) the operator is operated from the initial position to the neutral operation position and then (ii) the operator is returned to the initial position, and when the operator is continuously held at the neutral operation position for a first predetermined time or longer, change the shift range to the neutral range, and (4) when the operator has passed through at least one of the traveling operation positions while (i) the operator is operated from the initial position to the neutral operation position and then (ii) the operator is returned to the initial position, prohibit a change of the shift range to the neutral range even when the operator is continuously held at the neutral operation position for the first predetermined time or longer.

According to the above aspect, because the shift range of the automatic transmission is changed to the neutral range when the operator has been returned to the initial position, the shift range is not changed to the neutral range when the operator is kept at the neutral operation position for the first predetermined time or longer. Even when the operator is continuously held at the neutral operation position for the first predetermined time or longer and then the operator is returned to the initial position, the shift range is not changed to the neutral range when the operator passes through any one of the traveling operation positions. Thus, when the operation device includes the momentary operator that is operated from the initial position to any one of the traveling operation positions via the neutral operation position, it is possible to suppress a torque drop resulting from a change into the neutral range.

In the control system according to the above aspect, the electronic control unit may be configured to when the operator is continuously held at the neutral operation position for the first predetermined time or longer, enable a request to change into the neutral range. The electronic control unit may be configured to when the request to change into the neutral range is enabled at the time when the operator is returned from the neutral operation position to the initial position, and when the operator does not pass through any one of the traveling operation positions while (i) the operator is operated from the initial position to the neutral operation position and then (ii) the operator is returned to the initial position, change the shift range to the neutral range. According to the above aspect, the shift range is changed to the neutral range based on the two requirements, that is, the request to change into the neutral range based on the first predetermined time and a history as to whether or not the operator passes through any one of the traveling operation positions, with the result that it is possible to suppress a change into the neutral range against a driver's intention.

In the control system according to the above aspect, the electronic control unit may be configured to, when the operator is continuously held at the neutral operation position for a second predetermined time or longer, change the shift range to the neutral range irrespective of whether or not the operator is returned to the initial position, and the second predetermined time may be longer than the first predetermined time. According to the above aspect, when the operator is continuously held at the neutral operation position for the second predetermined time (longer than the first predetermined time) or longer while the operator is kept at the neutral operation position, it is possible to change the shift range to the neutral range on the assumption that the driver has an intention to change the shift range to the neutral range.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described in detail with reference to the accompanying drawings.

Figure 1:
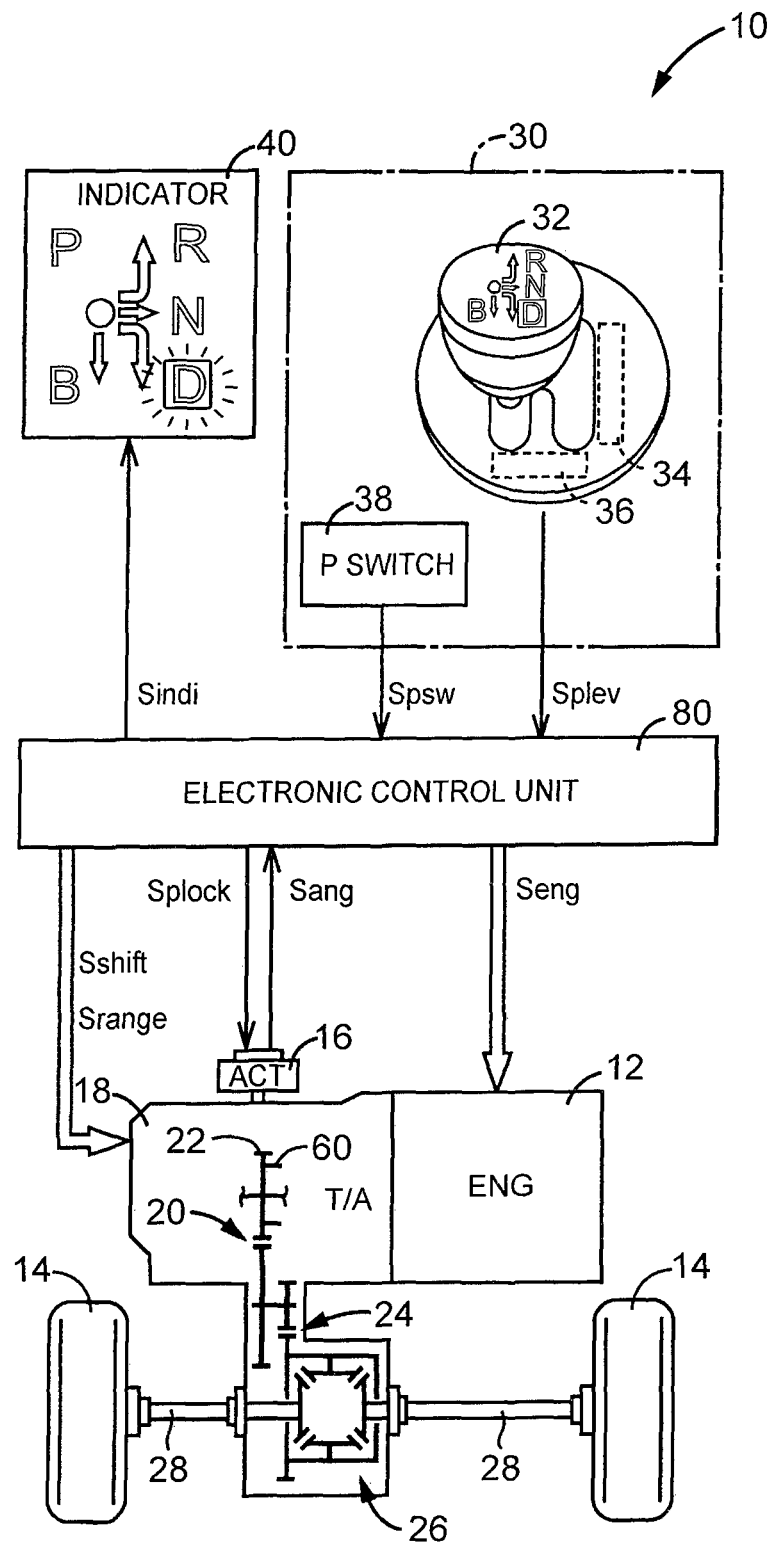
FIG. 1 is a view that illustrates the schematic configuration of a vehicle to which the invention is applied, and is a block diagram that illustrates a relevant portion of a control system provided in the vehicle.

FIG. 1 is a view that illustrates the schematic configuration of a power transmission path from an engine 12 to drive wheels 14, which constitute a vehicle 10 to which the invention is applied. FIG. 1 is a block diagram that illustrates a relevant portion of a control system provided in the vehicle 10 in order to control a change mechanism 16, and the like. As shown in FIG. 1, the vehicle 10 includes the change mechanism 16, an automatic transmission 18, and the like. The vehicle 10 employs a shift-by-wire (SBW) system in which a shift range (shift position) of the automatic transmission 18 is changed through electric control. The automatic transmission 18, for example, transmits the power of the engine 12 from an output gear 22 to the pair of drive wheels 14 sequentially via a counter gear pair 20, a final gear pair 24, a differential gear 26, a pair of drive shafts 28, and the like. The engine 12 is an internal combustion engine that serves as a power source for propelling the vehicle 10. The output gear 22 serves as an output rotating member of the automatic transmission 18. The output gear 22 constitutes one of the counter gear pair 20. These automatic transmission 18, counter gear pair 20, final gear pair 24, differential gear 26, and the like, constitute a transaxle that serves as a drive line. The vehicle 10 further includes an operation device 30.

The vehicle 10 includes an electronic control unit 80. The electronic control unit 80 includes a controller for the vehicle 10. The controller controls a change of the operation state of the change mechanism 16, a change of the shift range of the automatic transmission 18, or the like. The electronic control unit 80 includes a so-called microcomputer. The microcomputer includes, for example, a CPU, a RAM, a ROM, an input/output interface, and the like. The CPU executes various controls over the vehicle 10 by carrying out signal processing in accordance with a program prestored in the ROM while utilizing the temporary storage function of the RAM. For example, the electronic control unit 80 is configured to execute vehicle control, such as output control over the engine 12, shift control over the automatic transmission 18, change control over the shift range of the automatic transmission 18 using the shift-by-wire system, and change control over the operation state of the change mechanism 16. The electronic control unit 80 is split into a unit for output control over the engine 12, a unit for shift control over the automatic transmission 18, and the like, as needed. Various signals detected by various sensors provided in the vehicle 10 are supplied to the electronic control unit 80. The various sensors include, for example, a shift sensor 34, a select sensor 36, a P switch 38, an encoder 54 (see FIG. 3), and the like. The shift sensor 34 and the select sensor 36 are operation position sensors of a shift lever 32. The various signals include, for example, a shift lever position signal Splev, a P switch signal Spsw, a rotation signal Sang, and the like. The shift lever position signal Splev is an operation signal (sensor signal) corresponding to an operation position (lever position) Plev of the shift lever 32 at the time when the shift lever 32 is operated by a driver. The P switch signal Spsw is an operation signal corresponding to an operation position (P switch on position) Psw at the time when the P switch 38 is operated by the driver. The rotation signal Sang indicates a rotation angle of a P lock drive motor 52 (see FIG. 3), which is a position signal in the change mechanism 16. Various output signals are supplied from the electronic control unit 80 to the devices provided in the vehicle 10. The devices include, for example, the engine 12, the change mechanism 16, the automatic transmission 18, and the like. The various output signals include, for example, an engine output control command signal Seng, a P change control command signal Splock, a shift control command signal Sshift, a shift range change control command signal Srange, a shift range indication signal Sindi, and the like. The engine output control command signal Seng is used to execute output control over the engine 12. The P change control command signal Splock is used to execute change control over the change mechanism 16. The shift control command signal Sshift is used to execute shift control over the automatic transmission 18. The shift range change control command signal Srange is used to change the shift range of the automatic transmission 18. The shift range indication signal Sindi is used to indicate the shift range (including a P range) of the automatic transmission 18 by activating an indicator 40.

Figure 2:
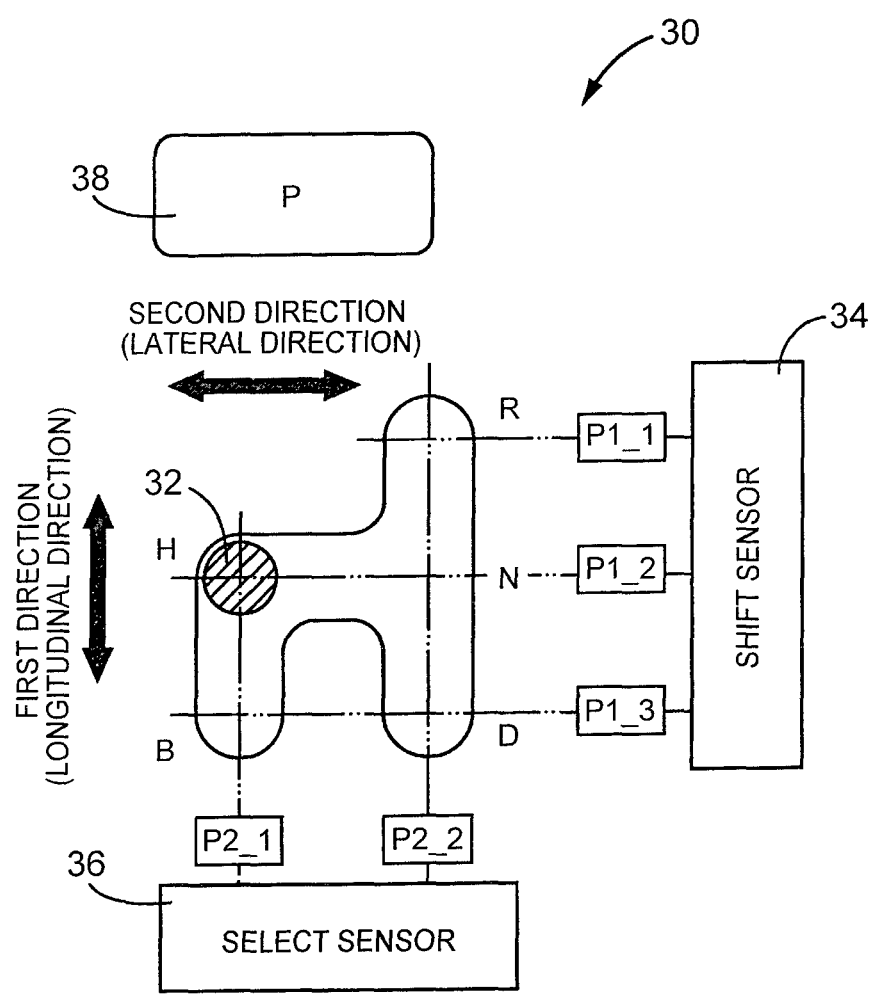
FIG. 2 is a view that shows an example of an operation device that changes among a plurality of shift ranges of an automatic transmission through artificial operation.

FIG. 2 is a view that shows an example of the operation device 30 that serves as a change device that is used to change among a plurality of shift ranges in the automatic transmission 18 through artificial operation. The operation device 30 is, for example, arranged near a driver seat. The operation device 30 includes the shift lever 32 and the P switch 38. The shift lever 32 is a momentary-type operator that is returned to an initial position (original position, home position) in a state where no external force is applied. The momentary-type operator is an automatic return operator that automatically returns from a position other than the initial position to the initial position when an operation force is released. The shift lever 32 is an operator that is selectively operated by the driver into a plurality of operation positions (lever positions Plev) corresponding to the plurality of shift ranges of the automatic transmission 18. The shift lever 32 is alternatively operated into the plurality of lever positions Plev by the driver in order to set the shift range of the automatic transmission 18 to a desired shift range (R, N or D range) other than a parking range (P range). The P switch 38 is provided as another switch near the shift lever 32. The P switch 38 is operated by the driver in order to activate parking lock by setting the shift range of the automatic transmission 18 to the P range. In this way, the operation device 30 is a momentary operation device in which the shift lever 32 returns to the initial position in a state where no external force is applied.

As shown in FIG. 2, the shift lever 32 is configured to be operated into each of R operation position (reverse operation position), N operation position (neutral operation position), D operation position (drive operation position), H position (home position) or B operation position (engine brake operation position). The R operation position, the N operation position and the D operation position are three lever positions Plev arranged in a front-to-rear direction or up-and-down direction (that is, longitudinal direction) of the vehicle 10. The H position and the B operation position are arranged parallel to the above three lever positions Plev. The shift lever 32 is operable in the longitudinal direction of the vehicle 10 among the R operation position, the N operation position and the D operation position. The shift lever 32 is operable in the longitudinal direction between the H position and the B operation position. The shift lever 32 is further operable in a lateral direction of the vehicle 10, which is perpendicular to the above longitudinal direction, between the H position and the N operation position. The H position is the initial position of the shift lever 32. Even when the shift lever 32 has been shifted into any one of the lever positions Plev (R, N, D and B operation positions) other than the H position, but when external force applied to the shift lever 32 disappears (that is, when the driver releases the shift lever 32), the shift lever 32 is configured to return to the H position owing to a mechanical mechanism, such as a spring.

The P switch 38 is, for example, a pushbutton switch. The P switch 38 outputs a P switch signal Spsw (also referred to as P operation signal Ppos) to the electronic control unit 80 when the P switch 38 is operated by the driver to P operation position that is the P switch on position Psw. The P switch on position is the P operation position or the parking operation position.

At the time when the operation device 30 has been operated into any one of the operation positions, the shift range of the automatic transmission 18 is electrically changed by the electronic control unit 80 to a shift range corresponding to the any one of the operation positions on the basis of the operation signal corresponding to the any one of the operation positions. At the time when the operation device 30 has been operated into any one of the operation positions, the state of the shift range of the automatic transmission 18 is indicated on the indicator 40. Because the shift lever 32 is returned to the initial position when external force applied to the shift lever 32 disappears, it is not possible to recognize the selected (finally determined) shift range only by visually identifying the shift lever 32. Therefore, the indicator 40 is provided at an easily viewable position from the driver. The state of the shift range of the automatic transmission 18 is configured to be indicated on the indicator 40, including the case where the selected shift range is the P range.

Each of the shift ranges (P, R, N and D ranges) of the automatic transmission 18 will be described. The P range is selected when the P switch 38 is set at the P operation position. The P range is a parking range at which the power transmission path in the automatic transmission 18 is interrupted and parking lock (P lock) that mechanically blocks rotation of the drive wheels 14 is activated by the change mechanism 16. The R range is selected when the shift lever 32 is set at the R operation position. The R range is a reverse traveling range at which driving force for causing the vehicle 10 to travel backward is transmitted to the drive wheels 14 (that is, reverse traveling range for causing the vehicle 10 to travel backward). The neutral range (N range) is selected when the shift lever 32 is set at the N operation position. The neutral range (N range) is a neutral range for setting a neutral state in which the power transmission path in the automatic transmission 18 is interrupted. The D range is selected when the shift lever 32 is set at the D operation position. The D range is a forward traveling range at which driving force for causing the vehicle 10 to travel forward is transmitted to the drive wheels 14 (that is, forward traveling range for causing the vehicle 10 to travel forward). The B range is selected when the shift lever 32 is set at the B operation position. The B range is a decelerating forward traveling range (engine brake range) at which rotation of the drive wheels 14 is decelerated by using engine brake at the D range.

A so-called shift-by-wire is employed in the vehicle 10 according to the present embodiment. As shown in FIG. 2, the shift lever 32 is two-dimensionally operated in a first direction P1 and a second direction P2. The first direction P1 is the above-described longitudinal direction. The second direction P2 is the lateral direction that intersects with (that is, perpendicular to) the first direction P1. Therefore, the operation device 30 includes the shift sensor 34 and the select sensor 36 as position sensors for detecting the lever position Plev of the shift lever 32. The shift sensor 34 serves as a first direction detection unit that detects an operation in the first direction P1. The select sensor 36 serves as a second direction detection unit that detects an operation in the second direction P2. Each of the shift sensor 34 and the select sensor 36 outputs a voltage to the electronic control unit 80 as the shift lever position signal Splev corresponding to the lever position Plev. That is, the shift sensor 34 and the select sensor 36 as a whole constitute a lever position detection unit that detects the lever position Plev. The electronic control unit 80 recognizes (determines) the lever position Plev on the basis of the voltage of the shift lever position signal Splev.

An example of recognition of the lever position Plev will be described. A detection signal voltage VSF of the shift sensor 34 has a voltage level corresponding to any one of a first direction first position P1_1, a first direction second position P1_2, and a first direction third position P1_3 (any one of a voltage that falls within a low range, a voltage that falls within a mid range and a voltage that falls within a high range). The first direction first position P1_1 indicates the R operation position. The first direction second position P1_2 indicates the H position or the N operation position. The first direction third position P1_3 indicates the B operation position or the D operation position. A detection signal voltage VSL of the select sensor 36 has a voltage level corresponding to one of a second direction first position P2_1 and a second direction second position P2_2 (one of a voltage that falls within a low range and a voltage that falls within a high range). The second direction first position P2_1 indicates the H position or the B operation position. The second direction, second position P2_2 indicates the R operation position, the N operation position or the D operation position. The electronic control unit 80 recognizes the lever position Plev (R, N, D or B operation position or H position) in accordance with a combination of the voltage levels by detecting the detection signal voltages VSF, VSL that change in this way. The vehicle 10 includes, for example, a plurality of sensors for detecting each of the lever positions Plev. The electronic control unit 80 may be configured to recognize the lever position Plev by detecting the shift lever position signal Splev (an R operation signal Rpos, an N operation signal Npos, a D operation signal Dpos, a B operation signal Bpos, or an H signal Hpos), which is output from the sensors.

Figure 3:
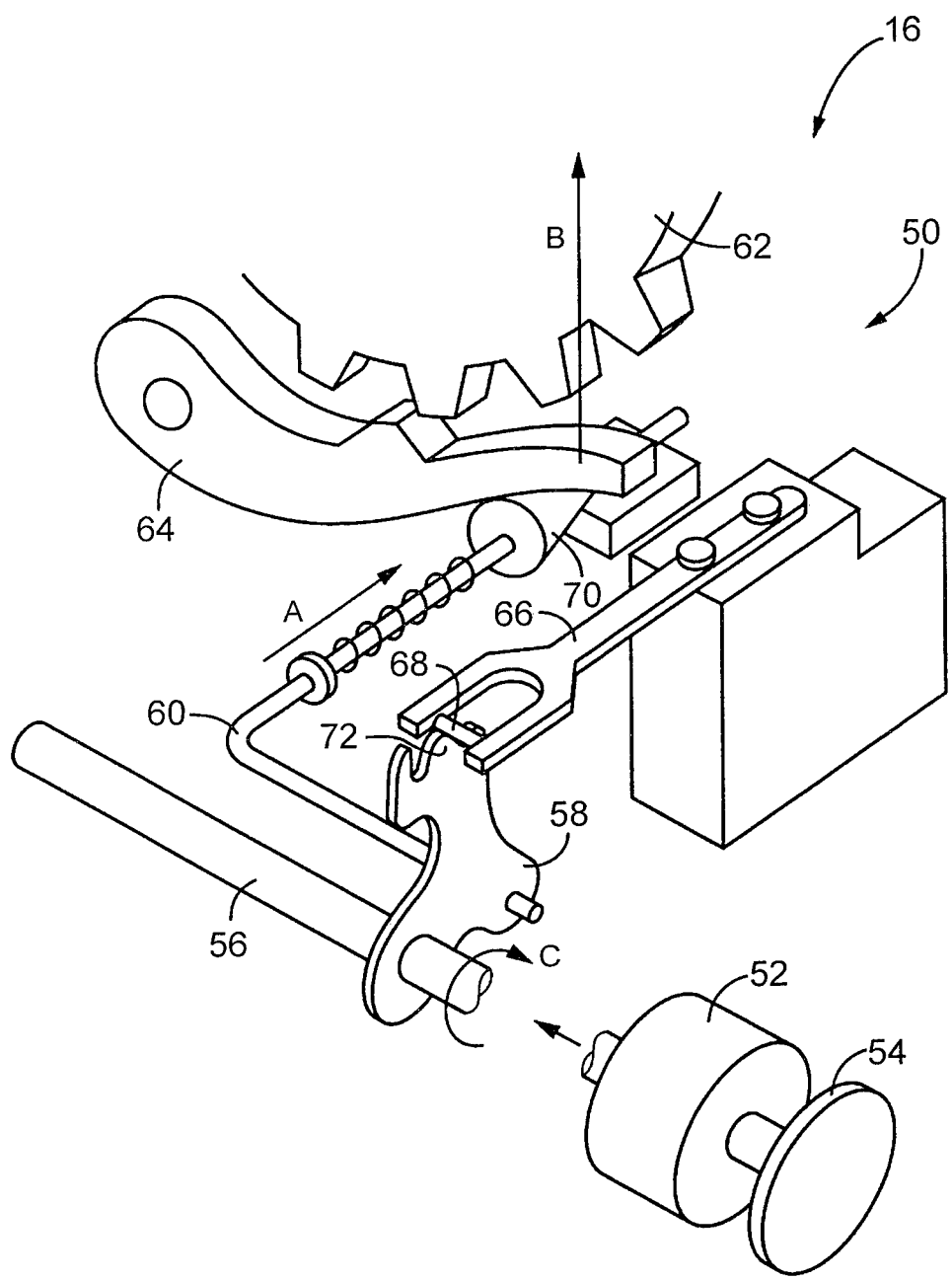
FIG. 3 is a perspective view that shows an example of a change mechanism that mechanically blocks rotation of drive wheels.

FIG. 3 is a perspective view that illustrates the configuration of the change mechanism 16 that activates P lock for mechanically fixing rotation of the output gear 22 of the automatic transmission 18. As shown in FIG. 3, the change mechanism 16 includes a P lock mechanism 50, the P lock drive motor 52, the encoder 54, and the like. The change mechanism 16 prevents movement of the vehicle 10 or permits movement of the vehicle 10 on the basis of a control signal from the electronic control unit 80.

The P lock mechanism 50 includes a shaft 56, a detent plate 58, a rod 60, a parking gear 62, a parking lock pawl 64, a detent spring 66, a roller 68, and the like. The shaft 56 is rotationally driven by the P lock drive motor 52. The detent plate 58 rotates with rotation of the shaft 56. The rod 60 operates with rotation of the detent plate 58. The parking gear 62 is fixed concentrically to the output gear 22 of the automatic transmission 18 (see FIG. 1), and rotates together with the drive wheels 14. The parking lock pawl 64 blocks (locks) rotation of the parking gear 62. The detent spring 66 limits rotation of the detent plate 58.

FIG. 3 shows a state at a non-parking lock position corresponding to a non-P range that is any one of the shift ranges (R, N, D and B ranges) other than the P range. This state is a non-locked state where a locked state is released. In the locked state, the parking lock pawl 64 engages with the parking gear 62. The P lock mechanism 50 does not interfere with rotation of the drive wheels 14 in the non-locked state. When the shaft 56 is rotated by the P lock drive motor 52 in the arrow C direction shown in FIG. 3 from this state, the rod 60 is pressed in the arrow A direction shown in FIG. 3 via the detent plate 58. As a result, the parking lock pawl 64 is pushed upward in the arrow B direction shown in FIG. 3 by a tapered member 70 provided at the distal end of the rod 60. When the detent plate 58 has rotated to such an extent that the roller 68 at one of two concave portions provided at the top of the detent plate 58 climbs over a convex portion 72 and shifts into the other concave portion, the parking lock pawl 64 is pushed up to a position at which the parking lock pawl 64 engages with the parking gear 62. Thus, rotation of the drive wheels 14 that rotate in interlocking with the parking gear 62 is mechanically blocked, and a parking lock position corresponding to the P range is set.

Figure 4:
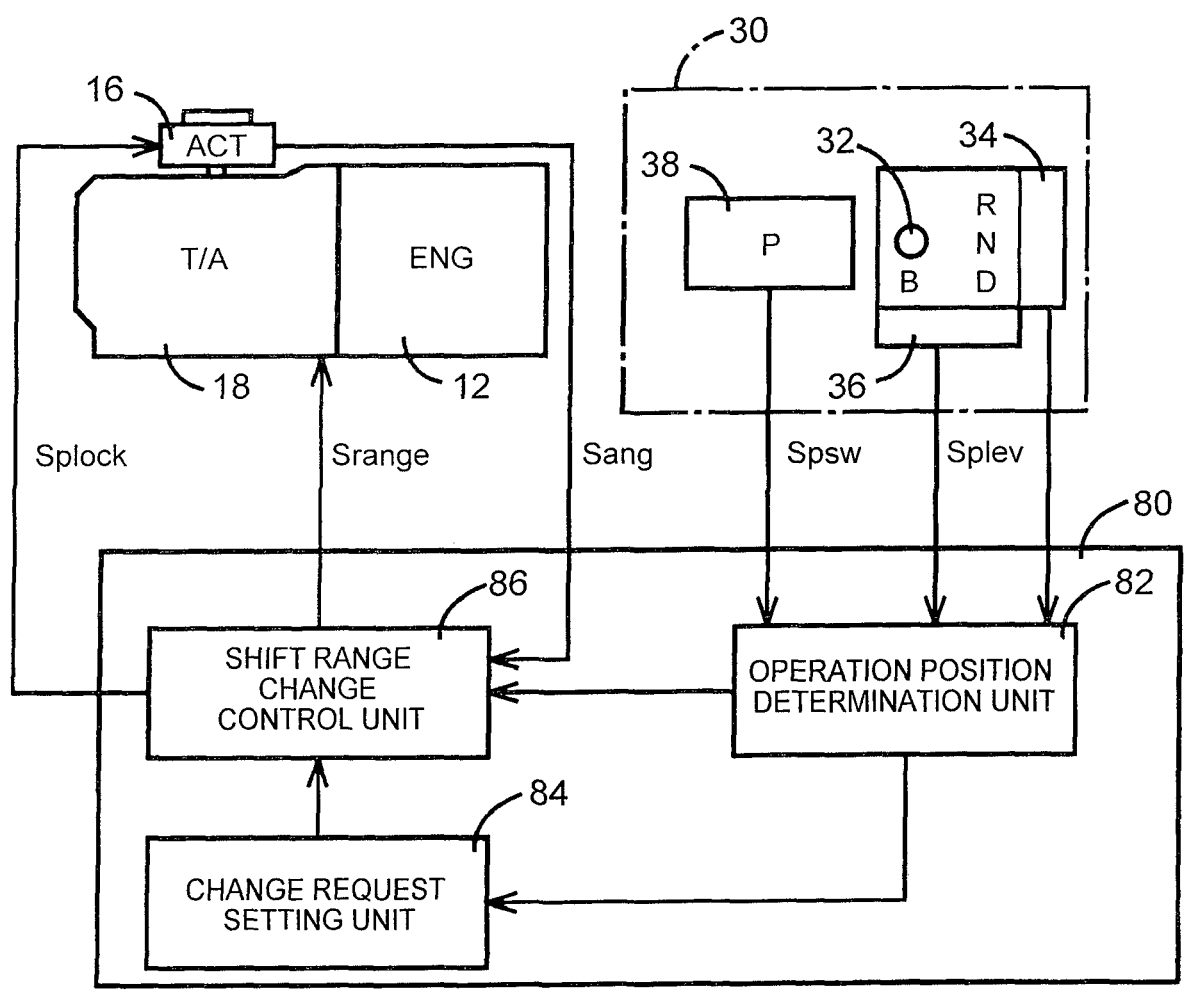
FIG. 4 is a functional block diagram that illustrates a relevant portion of control functions of an electronic control unit.

FIG. 4 is a functional block diagram that illustrates a relevant portion of control functions of the electronic control unit 80. As shown in FIG. 4, the electronic control unit 80 functionally includes an operation position determination unit 82, a change request setting unit 84 and a shift range change control unit 86. The operation position determination unit 82 may be operation position determination means. The change request setting unit 84 may be change request setting means. The shift range change control unit 86 may be shift range change control means.

The operation position determination unit 82 determines driver's operation to the shift lever 32 on the basis of, for example, the shift lever position signal Splev. Specifically, the operation position determination unit 82 determines the operation position of the shift lever 32 on the basis of the shift lever position signal Splev, and determines whether there is a change into a predetermined operation position. The operation position determination unit 82 determines whether there is a change from the predetermined operation position to the H position or another operation position. When the operation position determination unit 82 determines that there is a change into the predetermined operation position, the operation position determination unit 82 determines whether the shift lever 32 has been continuously held at the predetermined operation position. While the operation position determination unit 82 determines that the shift lever 32 has been continuously held at the predetermined operation position, a time during which a sensor signal corresponding to the predetermined operation position is continuously output is counted (counted up) on the basis of the sensor signal. The operation position determination unit 82 determines whether the sensor signal has been continuously output for a predetermined time T or longer (that is, the shift lever 32 has been continuously held at the predetermined operation position for the predetermined time T or longer). The predetermined operation position is, for example, an example of each of the N operation position, the R operation position, the D operation position and the B operation position. The predetermined time T is, for example, an operation position determination threshold obtained and stored in advance by a design or an experiment (that is, determined in advance) as a time by which it may be determined that the shift lever 32 has been definitely held at the predetermined operation position by a driver's intention. The predetermined time T may be set to a uniform value for the operation positions or may be set to different values for the operation positions. The predetermined time T at the N operation position will be described in detail later.

For example, when the operation position determination unit 82 determines that the sensor signal corresponding to the predetermined operation position has been continuously output for the predetermined time T or longer, the change request setting unit 84 enables a request to change into the predetermined shift range of the automatic transmission 18, which corresponds to the predetermined operation position. For example, the change request setting unit 84 sets a range change request signal to an on state.

The shift range change control unit 86 electrically changes the shift range of the automatic transmission 18 on the basis of, for example, the request to change into the predetermined shift range, enabled by the change request setting unit 84 (for example, the range change request signal set to the on state). Specifically, the shift range change control unit 86 determines, on the basis of the rotation signal Sang of the P lock drive motor 52, whether the shift range of the automatic transmission 18 is the P range or the non-P range. When the request to change into any one of the non-P ranges is enabled by the change request setting unit 84 at the time when the shift range is the P range, the shift range change control unit 86 sets the parking gear 62 to the non-locked state by activating the change mechanism 16. The non-P range is the R, N or D range. When the shift range is the P range, a reject function works to keep the P range even when there is a request to change into the B range. The request to change into any one of the non-P ranges is enabled, for example, when any one of an R range change request signal Rreq, an N range change request signal Nreq and a D range change request signal Dreq is in an on state. Thus, the shift range of the automatic transmission 18 is changed from the P range to the non-P range, and the shift range is changed to any one of the R range, the N range and the D range, corresponding to the range change request signal.

When the shift range is changed to any one of traveling ranges (the R range, the D range and the B range (only when the shift range is set at the D range)) at the time when the shift range is the non-P range (R, N, D or B range), the shift range change control unit 86 quickly changes the shift range at the timing at which the range change request signal corresponding to any one of the traveling ranges has been set to the on state by the change request setting unit 84. Incidentally, in the operation device 30 according to the present embodiment, the shift lever 32 is selectively operated by the driver from the H position to any one of a plurality of traveling operation positions (the D operation position and the R operation position) via the N operation position. The plurality of traveling operation positions respectively correspond to the plurality of traveling ranges (the D range and the R range) of the automatic transmission 18. The N operation position corresponds to the N range of the automatic transmission 18. Therefore, when the shift lever 32 is operated into the traveling operation position corresponding to another traveling range via the N operation position at the time when the shift range of the automatic transmission 18 is any one of the traveling ranges (R, D, B ranges), if change control for changing the shift range into the N range by the shift range change control unit 86 is quickly executed at the timing at which the N range change request signal Nreq is set to the on state, there is a possibility that the shift range is once changed to the N range in process of shift lever operation into the traveling operation position. As a result, there is a possibility that, in a traveling state where a change between the R range and the D range is repeatedly carried out in a short period of time or when the shift range is returned to the D range while the vehicle 10 is traveling at the B range, a torque (driving force) drop occurs against a driver's intention because of the temporarily set N range, and there is a possibility that a ride comfort is impaired. That is, there is a possibility that a torque (driving force) drop occurs as a result of a change of the shift range to the N range at the timing at which the driver is not assuming.

Such an inconvenience is, for example, more remarkable as the predetermined time T (operation position determination threshold) at the N operation position becomes shorter. That is, when the predetermined time T at the N operation position is made short so as to be comparable to the predetermined time T at another operation position or made shorter than the predetermined time T at another operation position, an operation time of the shift lever 32 becomes uniform, with the result that it becomes easy to understand an operation or it is possible to more quickly change into the N range. However, at the time of a change into the traveling range (R or D range), there is a possibility that the shift range is once changed to the N range. In contrast, when the predetermined time T at the N operation position is made longer than the predetermined time T at another operation position, it becomes difficult to change into the N range. However, when the driver intends to change into the N range, it is required to extend the driver's operation time of the shift lever 32, so there is a possibility that the driver experiences a burden.

Therefore, the present embodiment suggests a control method of improving the controllability of a change into the N range in the case where the shift lever 32 has been operated into the N operation position when the shift range of the automatic transmission 18 is any one of the traveling ranges (R, D and B ranges). This control method is implemented only by adding a control logic and is implemented without addition of a special sensor or specifically increasing the load of the CPU, and the like, in the electronic control unit 80.

Specifically, the shift range change control unit 86 changes the shift range of the automatic transmission 18 to the N range when the shift lever 32 has been operated from the H position to the N operation position and then the shift lever 32 has been returned to the H position. More specifically, when the shift lever 32 has not passed through any one of the traveling operation positions (R and D operation positions) while the shift lever 32 is operated from the H position to the N operation position and then the shift lever 32 is returned to the H position and when the shift lever 32 has been continuously held at the N operation position for a first predetermined time T1 or longer, the shift range change control unit 86 changes the shift range of the automatic transmission 18 to the N range. On the other hand, when the shift lever 32 has passed through at least one of the traveling operation positions (R and D operation positions) while the shift lever 32 is operated from the H position to the N operation position and then the shift lever 32 is returned to the H position, the shift range change control unit 86 does not change (prohibits a change of) the shift range of the automatic transmission 18 to the N range even when the shift lever 32 has been continuously held at the N operation position for the first predetermined time T1 or longer. The first predetermined time T1 is the predetermined time T at the N operation position. The first predetermined time T1 is, for example, a determination threshold determined in advance as a time having substantially the same length as the predetermined time T at the R or D operation position. By employing the above-described method, even when the predetermined time T at the N operation position is set so as to be comparable to or shorter than the predetermined time T at the R or D operation position, a change into the N range in process of shift lever operation into any one of the traveling operation positions (R and D operation positions) is suppressed. When the driver intends to change the shift range to the N range, it is possible to quickly change the shift range to the N range. By setting the predetermined time T at the N operation position to the length comparable to the predetermined time T at the R or D operation position, the operation time of the shift lever 32 becomes uniform, so it becomes easy to understand an operation.

In order to appropriately carry out the above-described control method, the operation position determination unit 82 determines the operation position of the shift lever 32 on the basis of the shift lever position signal Splev. The operation position determination unit 82 determines whether there is a change from the H position to the N operation position. The operation position determination unit 82 determines whether there is a change from the N operation position to the H position or another operation position. A change from the N operation position to another operation position is, for example, a change from the N operation position to any one of the traveling operation positions (R and D operation positions). Particularly, when the operation position determination unit 82 determines that there is a change from the N operation position to any one of the traveling operation positions (R and D operation positions), the operation position determination unit 82 temporarily stores the fact that there is a change into any one of the traveling operation positions (R and D operation positions) as a history that the shift lever 32 has passed through any one of the traveling operation positions (R and D operation positions), until the operation position of the shift lever 32 returns to the H position. The fact that there is a change into any one of the traveling operation positions (R and D operation positions) is that the shift lever 32 has passed through at least one of the traveling operation positions (R and D operation positions). When the operation position determination unit 82 determines that there is a change from the N operation position to the H position, the operation position determination unit 82 determines whether there is a history that the shift lever 32 has passed through any one of the traveling operation positions (R and D operation positions). When the operation position determination unit 82 determines that there is a change from the H position to the N operation position, the operation position determination unit 82 determines whether the shift lever 32 has been continuously held at the N operation position. While the operation position determination unit 82 determines that the shift lever 32 has been continuously held at the N operation position, the operation position determination unit 82 counts (counts up) a time during which the N operation signal Npos has been continuously output, on the basis of the sensor signal (N operation signal Npos) corresponding to the N operation position. The operation position determination unit 82 determines whether the N operation signal Npos has been continuously output for the first predetermined time T1 or longer. Whether the N operation signal Npos has been continuously output for the first predetermined time T1 or longer is whether the shift lever 32 has been continuously held at the N operation position for the first predetermined time T1 or longer.

When the operation position determination unit 82 determines that the N operation signal Npos has been continuously output for the first predetermined time T1 or longer, the change request setting unit 84 enables the request to change into the N range of the automatic transmission 18, corresponding to the N operation position (for example, sets the range change request signal Nreq to the on state).

When the request to change into the N range is enabled by the change request setting unit 84 at the time when the shift lever 32 has been returned from the N operation position to the H position, and when the shift lever 32 has not passed through any one of the traveling operation positions (R and D operation positions) while the shift lever 32 is operated from the H position to the N operation position and then returned to the H position, the shift range change control unit 86 changes the shift range of the automatic transmission 18 to the N range (finally determines the N range). The time when the shift lever 32 has been returned from the N operation position to the H position means the time when the operation position determination unit 82 determines that there is a change from the N operation position to the H position. The case where the request to change into the N range is enabled by the change request setting unit 84 and the shift lever 32 has not passed through any one of the traveling operation positions (R and D operation positions) while the shift lever 32 is operated from the H position to the N operation position and then returned to the H position means the case where the operation position determination unit 82 determines that there is no history that the shift lever 32 has passed through any one of the traveling operation positions (R and D operation positions). On the other hand, even when the request to change into the N range is enabled by the change request setting unit 84 at the time when the operation position determination unit 82 determines that there is a change from the N operation position to the H position, but when the operation position determination unit 82 determines that there is a history that the shift lever 32 has passed through any one of the traveling operation positions (R and D operation positions), the shift range change control unit 86 does not change (prohibits a change of) the shift range of the automatic transmission 18 to the N range.

At the time when the shift lever 32 has been returned from the N operation position to the H position, when the shift range change control unit 86 finally determines the N range or the operation position determination unit 82 determines that there is a history that the shift lever 32 has passed through any one of the traveling operation positions (R and D operation positions), the change request setting unit 84 disables the request to change into the N range (for example, sets the range change request signal Nreq to an off state).

Figure 5:
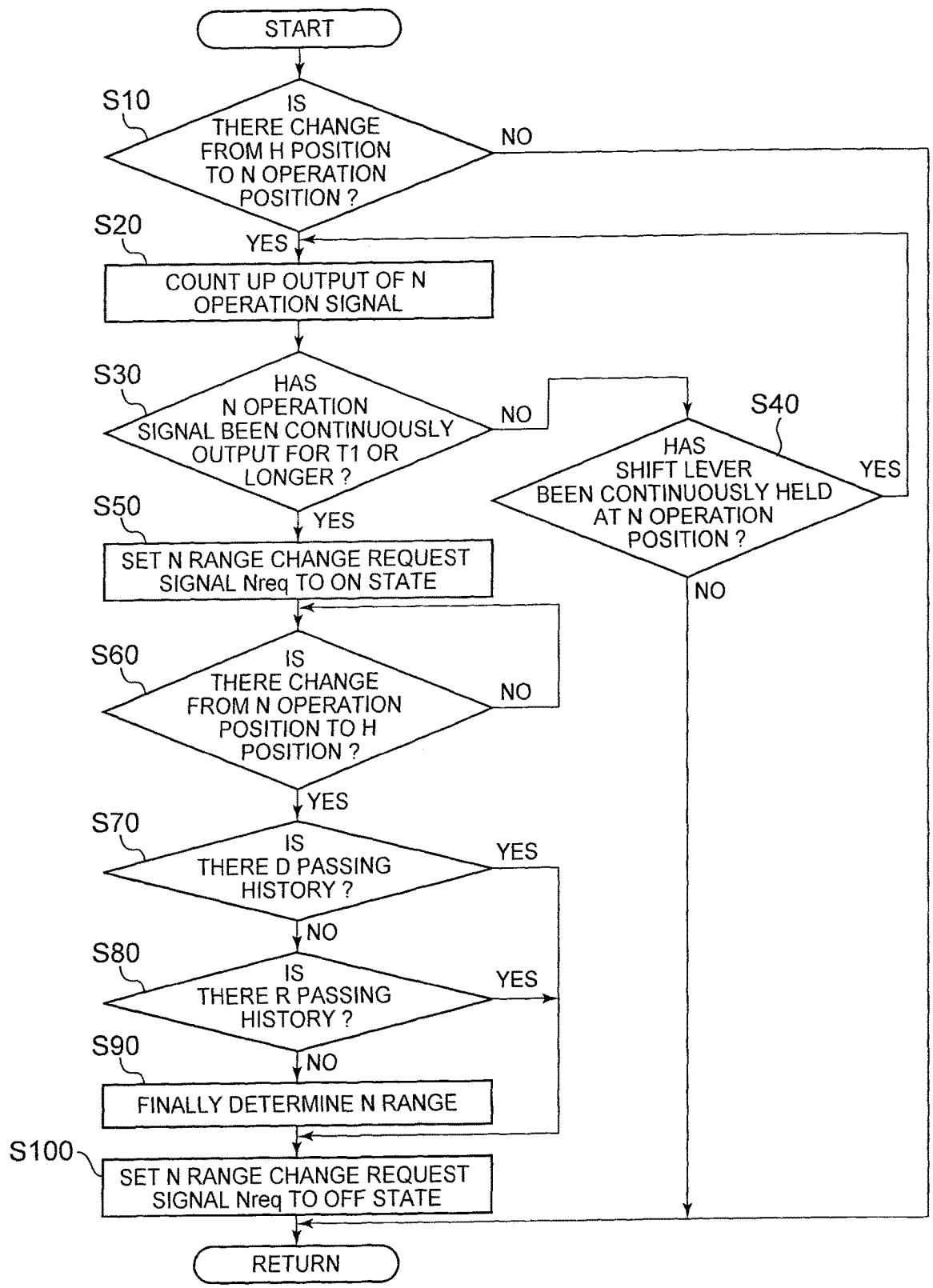
FIG. 5 is a flowchart that illustrates a relevant portion of control operations of the electronic control unit, that is, control operations for suppressing a torque drop resulting from a change into an N range when the operation device includes a momentary-type shift lever that is operated from an H position to a traveling operation position (R or D operation position) via an N operation position.
Figure 6:
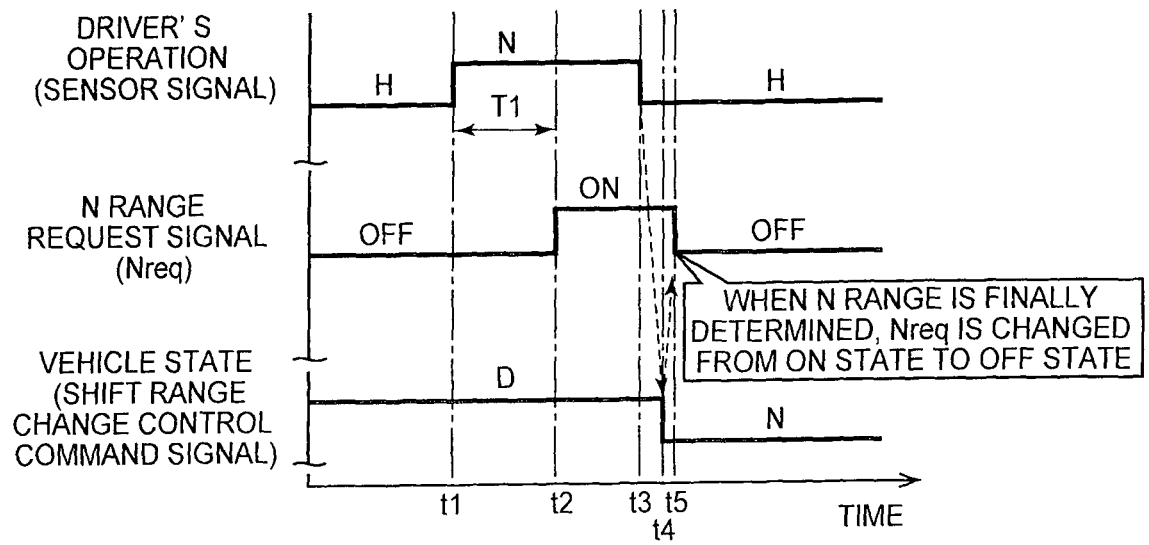
FIG. 6 is a time chart in the case where the control operations shown in the flowchart of FIG. 5 are executed, and is an example of the case where the shift range is changed to the N range.
Figure 7:
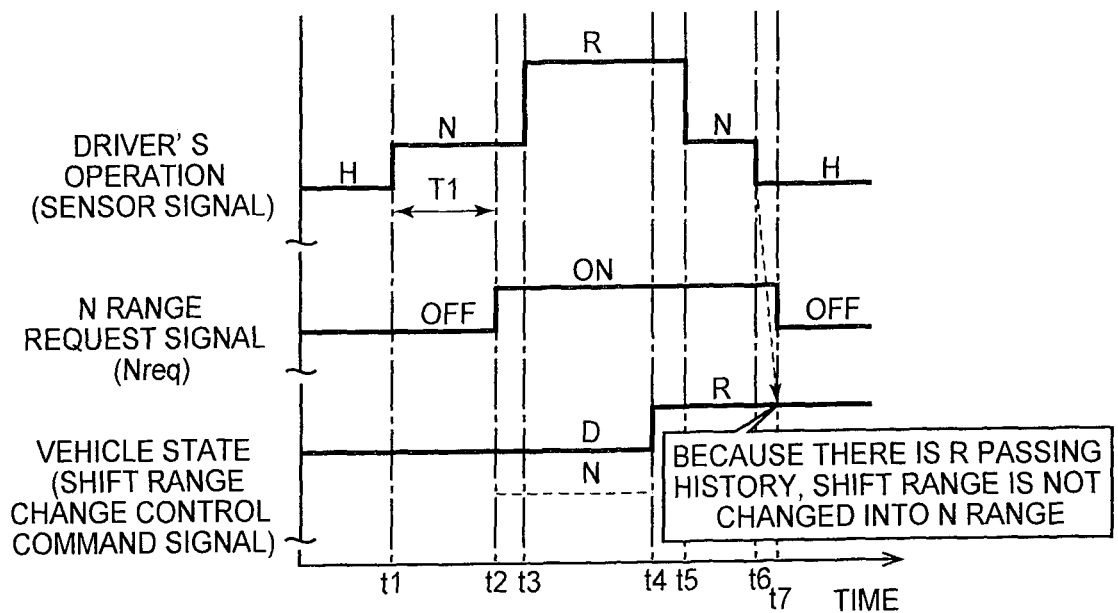
FIG. 7 is a time chart in the case where the control operations shown in the flowchart of FIG. 5 are executed, and is an example of the case where the shift range is not changed to the N range at the time of a change from a D range to an R range.
Figure 8:
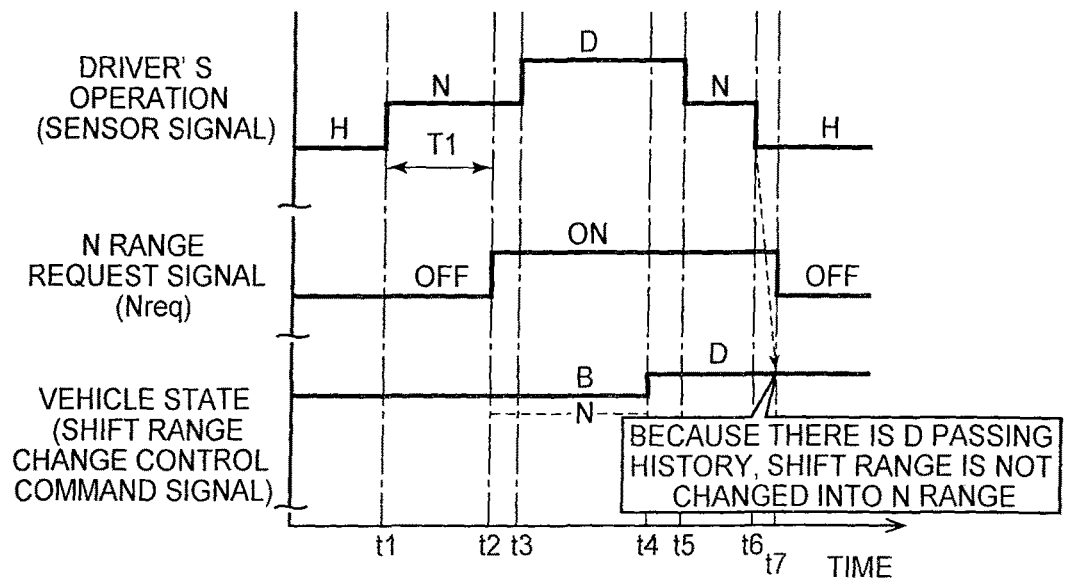
FIG. 8 is a time chart in the case where the control operations shown in the flowchart of FIG. 5 are executed, and is an example of the case where the shift range is not changed to the N range at the time of a change from a B range to the D range.

FIG. 5 is a flowchart that illustrates control operations of the electronic control unit 80. The flowchart is, for example, repeatedly executed at an extremely short cycle time of about several milliseconds to several tens of milliseconds. The control operations of the electronic control unit 80 are control operations for, when the operation device 30 (shift lever 32) includes the momentary-type shift lever 32 that is operated from the H position to any one of the traveling operation positions (R and D operation positions) via the N operation position, suppressing a torque drop resulting from a change into the N range. FIG. 6, FIG. 7 and FIG. 8 are examples of the time chart in the case where the control operations shown in the flowchart of FIG. 5 are executed. The control operations shown in the flowchart of FIG. 5 are preferably executed when the shift range of the automatic transmission 18 is any one of the traveling ranges (R, D and B ranges) at the H position.

As shown in FIG. 5, initially, in step (hereinafter, step is omitted) S10 corresponding to the operation position determination unit 82, for example, it is determined whether there is a change from the H position to the N operation position. When negative determination is made in S10, the routine is ended. On the other hand, when affirmative determination is made in S10 (see t1 timing in FIG. 6, FIG. 7 and FIG. 8), for example, a time during which the N operation signal Npos has been continuously output is counted up in S20 corresponding to the operation position determination unit 82. Subsequently, in S30 corresponding to the operation position determination unit 82, for example, it is determined whether the N operation signal Npos has been continuously output for the first predetermined time T1 or longer (see from t1 timing in FIG. 6, FIG. 7 and FIG. 8). When negative determination is made in S30, for example, it is determined in S40 corresponding to the operation position determination unit 82 whether the shift lever 32 has been continuously held at the N operation position. When negative determination is made in S40, the routine is ended. On the other hand, when affirmative determination is made in S40, the process is returned to S20. When affirmative determination is made in S30, for example, the range change request signal Nreq is set to the on state in S50 corresponding to the change request setting unit 84 (see t2 timing in FIG. 6, FIG. 7 and FIG. 8). Subsequently, in S60 corresponding to the operation position determination unit 82, for example, it is determined whether there is a change from the N operation position to the H position (see from t2 timing in FIG. 6, FIG. 7 and FIG. 8). When negative determination is made in S60, S60 is repeatedly executed. On the other hand, when affirmative determination is made in S60 (see t3 timing in FIG. 6 and see t6 timing in FIG. 7 and FIG. 8), for example, it is determined in S70 corresponding to the operation position determination unit 82 whether there is a history that the shift lever 32 has passed through the D operation position (hereinafter, referred to as D passing history). When negative determination is made in S70, for example, it is determined in S80 corresponding to the operation position determination unit 82 whether there is a history that the shift lever 32 has passed through the R operation position (hereinafter, referred to as R passing history). When negative determination is made in S80, for example; the N range is finally determined as the shift range of the automatic transmission 18 in S90 corresponding to the shift range change control unit 86 (see t4 timing in FIG. 6). When affirmative determination is made in S70 or S80 or subsequent to S90, for example, the range change request signal Nreq is set to the off state in S100 corresponding to the change request setting unit 84 (see t5 timing in FIG. 6 and t7 timing in FIG. 7 and FIG. 8).

FIG. 6 is an example of the case where the shift range is changed to the N range. FIG. 7 is an example of the case where the shift range is not changed to the N range at the time of a change from the D range to the R range. FIG. 8 is an example of the case where the shift range is not changed to the N range at the time of a change from the B range to the D range. The t3 timing to the t5 timing in FIG. 6 or the t6 timing and the t7 timing in FIG. 7 and FIG. 8 are substantially the same timing in each time chart; however, the intervals are provided in order to clearly indicate the time sequence. The dashed-line arrows in FIG. 6, FIG. 7 and FIG. 8 sequentially indicate the time sequence. A vehicle state in FIG. 6, FIG. 7 and FIG. 8 does not indicate an actual power transmission state in the automatic transmission 18 but indicates a controlled state of the shift range. The vehicle state in FIG. 6, FIG. 7 and FIG. 8, in other words, indicates the shift range change control command signal Srange that is output from the electronic control unit 80. The dashed lines in the vehicle state in FIG. 7 and FIG. 8 indicate comparative embodiments in which the shift range is changed to the N range at the timing at which the N operation signal Npos has been continuously output for the first predetermined time T1 or longer.

In FIG. 6, as shown at t3 timing, at the time when the shift lever 32 has been returned from the N operation position to the H position, the range change request signal Nreq is in the on state and there is no history that the shift lever 32 has passed through any one of the traveling operation positions (R and D operation positions). Thus, the shift range of the automatic transmission 18 is changed from the D range to the N range at t4 timing, and the N range is finally determined. At t5 timing after the final determination of the N range, the range change request signal Nreq is set to the off state. In FIG. 7 and FIG. 8, as shown at t6 timing, at the time when the shift lever 32 has been returned from the N operation position to the H position, the range change request signal Nreq is in the on state. However, there is the R passing history (in the case of FIG. 7; the D passing history in FIG. 8) from t3 timing to t5 timing, so the shift range is not changed to the N range at t7 timing, and the range change request signal Nreq is set to the off state. The shift range is quickly changed to the R range (in the case of FIG. 7; the D range in FIG. 8) at t4 timing. However, different from the comparative embodiment indicated by the dashed lines, the shift range is not changed to the N range at t2 timing. Thus, a torque drop in process of an operation into the R operation position (in the case of FIG. 7; the D operation position in FIG. 8) is avoided.

As described above, according to the present embodiment, when the shift lever 32 has been returned to the H position, the shift range of the automatic transmission 18 is changed to the N range. Thus, when the shift lever 32 has been continuously kept at the N operation position for the first predetermined time T1 or longer, the shift range is not changed to the N range. Even when the shift lever 32 has been continuously held at the N operation position for the first predetermined time T1 or longer and then the shift lever 32 has been returned to the H position, but when the shift lever 32 has passed through any one of the traveling operation positions (R and D operation positions), the shift range is not changed to the N range. Thus, when the operation device 30 includes the momentary-type shift lever 32 that is operated from the H position to any one of the traveling operation positions (R and D operation positions) via the N operation position, it is possible to suppress a torque drop resulting from a change into the N range.

According to the present embodiment, when the request to change into the N range is enabled by the change request setting unit 84 at the time when the shift lever 32 has been returned from the N operation position to the H position and the shift lever 32 has not passed through any one of the traveling operation positions (R and D operation positions) while the shift lever 32 is operated from the H position to the N operation position and then returned to the H position, the shift range change control unit 86 changes the shift range of the automatic transmission 18 to the N range. Thus, the shift range is changed to the N range on the basis of the two requirements, that is, the request to change into the N range based on the first predetermined time T1 and the history as to whether the shift lever 32 has passed through any one of the traveling operation positions (R and D operation positions), with the result that it is possible to suppress a change into the N range against a driver's intention.

Next, other embodiments of the invention will be described. In the following description, like reference numerals denote portions common to the embodiments, and the description thereof is omitted.

In the above-described first embodiment, the shift range of the automatic transmission 18 is changed into the N range at the time when the shift lever 32 has been operated from the H position to the N operation position and then has been returned to the H position. Incidentally, it is conceivable that the driver keeps the shift lever 32 at the N operation position with the intention of changing into the N range. Therefore, in the present embodiment, in addition to the above-described first embodiment, when the shift lever 32 has been continuously held at the N operation position for a second predetermined time T2 or longer, the shift range change control unit 86 changes the shift range of the automatic transmission 18 to the N range irrespective of whether the shift lever 32 has been returned to the H position (for example, even when the shift lever 32 is not returned to the H position). The second predetermined time T2 is longer than the first predetermined time T1. The second predetermined time T2 is the predetermined time T at the N operation position determined in advance separately from the first predetermined time T1, and is a determination threshold determined in advance as a time having a length of about several times as long as the first predetermined time T1. In this way, the present embodiment suggests a control method for further improving the controllability of a change into the N range in the case where the shift lever 32 has been operated into the N operation position.

In order to appropriately execute the above-described control method, the operation position determination unit 82 determines the operation position of the shift lever 32 on the basis of the shift lever position signal Splev, and determines whether there is a change from the H position or any one of the traveling operation positions (R and D operation positions) to the N operation position. When the operation position determination unit 82 determines that there is a change into the N operation position, the operation position determination unit 82 determines whether the shift lever 32 has been continuously held at the N operation position. While the operation position determination unit 82 determines that the shift lever 32 has been continuously held at the N operation position, the operation position determination unit 82 counts (counts up) a time during which the N operation signal Npos has been continuously output, on the basis of the sensor signal corresponding to the N operation position (N operation signal Npos). The operation position determination unit 82 determines whether the N operation signal Npos has been continuously output for the second predetermined time T2 or longer (that is, whether the shift lever 32 has been continuously held at the N operation position for the second predetermined time T2 or longer).

When the operation position determination unit 82 determines that the N operation signal Npos has been continuously output for the second predetermined time T2 or longer while the shift lever 32 is held at the N operation position, the shift range change control unit 86 changes the shift range of the automatic transmission 18 to the N range (finally determines the N range).

When the shift range change control unit 86 finally determines the N range while the shift lever 32 is held at the N operation position, the change request setting unit 84 disables the request to change into the N range (for example, sets the range change request signal Nreq to the off state).

By executing the above-described control method, for example, in process of such an operation of the shift lever 32 that the shift lever 32 is operated from the H position to the N operation position and then returned to the H position without passing through any one of the traveling operation positions (R and D operation positions), when the shift lever 32 has been continuously held at the N operation position for the second predetermined time T2 or longer, it is possible to quickly change the shift range to the N range not at the time when the shift lever 32 has been returned to the H position but at the time when the shift lever 32 is kept at the N operation position on the assumption that the driver has an intention to change into the N range. In process of such an operation of the shift lever 32 that the shift lever 32 is operated from the H position to the N operation position and then passes through any one of the traveling operation positions (R and D operation positions), when the shift lever 32 has been continuously held at the N operation position for the second predetermined time T2 or longer, it is possible to change the shift range to the N range in advance of a change into any one of the traveling ranges (R and D ranges) corresponding to the traveling operation positions (R and D operation positions) when the shift lever 32 is kept at the N operation position on the assumption that the driver has an intention to change into the N range. In process of such an operation of the shift lever 32 that, after the shift range has been changed to any one of the traveling ranges (R and D ranges) corresponding to the traveling operation positions (R and D operation positions), the shift lever 32 is operated from the any one of the traveling operation positions (R and D operation positions) to the N operation position and then returned to the H position, when the shift lever 32 has been continuously held at the N operation position for the second predetermined time T2 or longer, although there is a history that the shift lever 32 has passed through any one of the traveling operation positions (R and D operation positions), it is possible to change the shift range to the N range at the time when the shift lever 32 is kept at the N operation position on the assumption that the driver has an intention to change into the N range.

Figure 9:
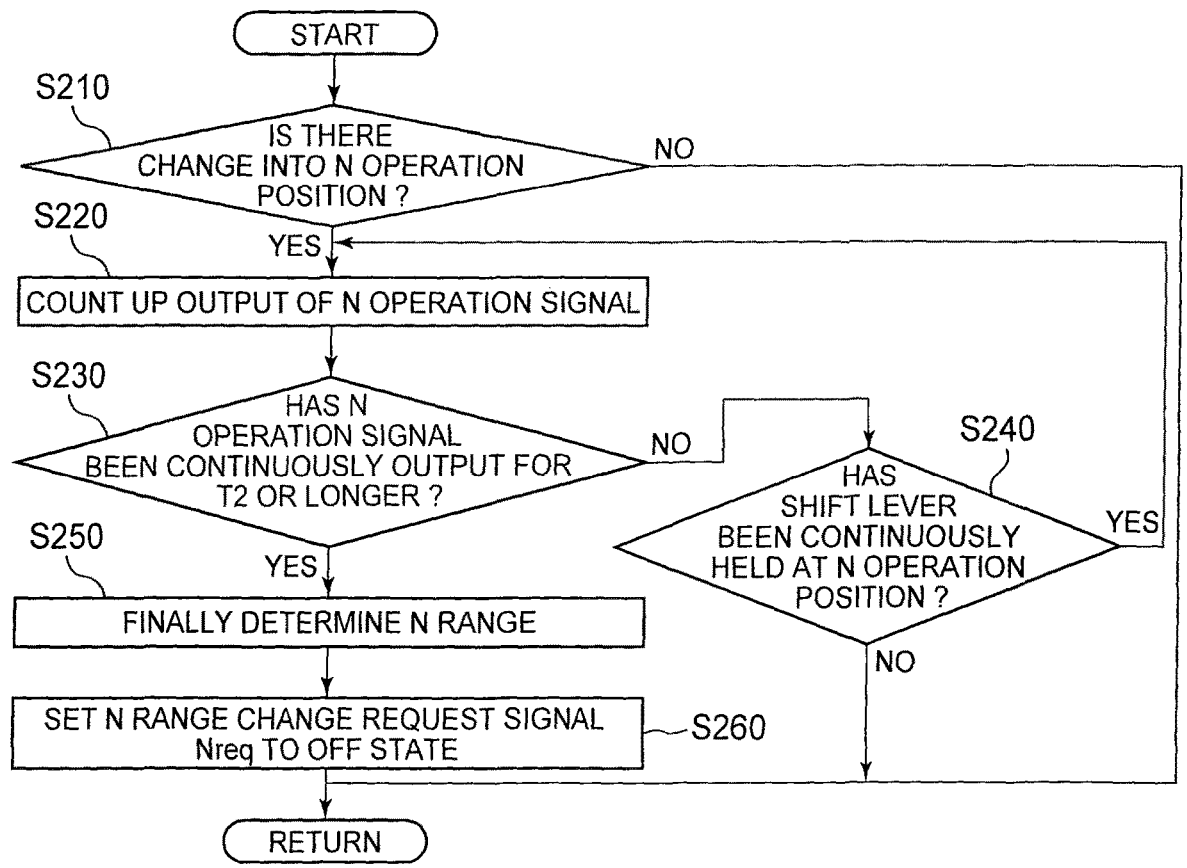
FIG. 9 is a flowchart for illustrating a relevant portion of control operations of the electronic control unit, that is, control operations for further improving the controllability of a change into the N range.
Figure 10:
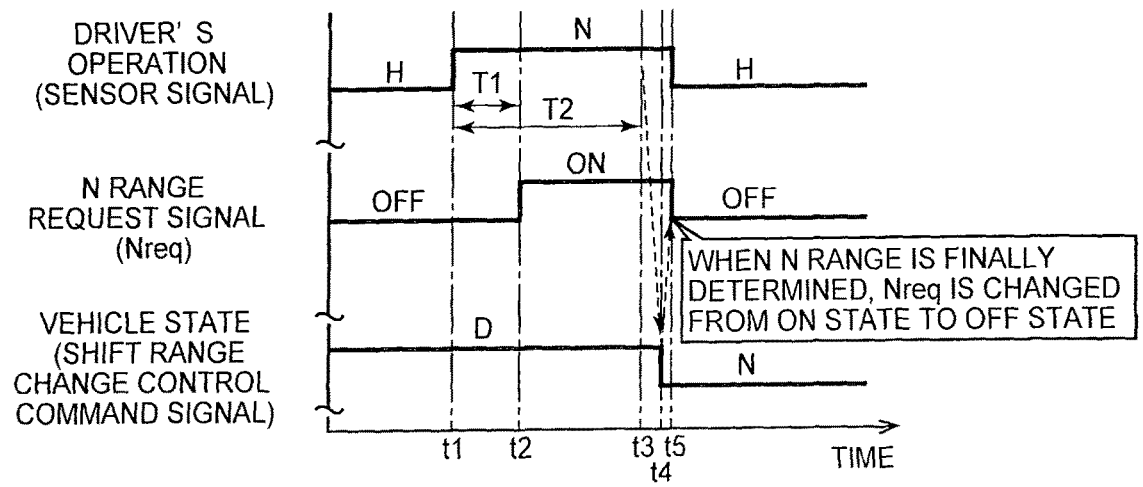
FIG. 10 is a time chart in the case where the control operations shown in the flowchart of FIG. 9 are executed, and is an example of the case where the shift lever is not operated to any traveling operation position (R or D operation position)
Figure 11:
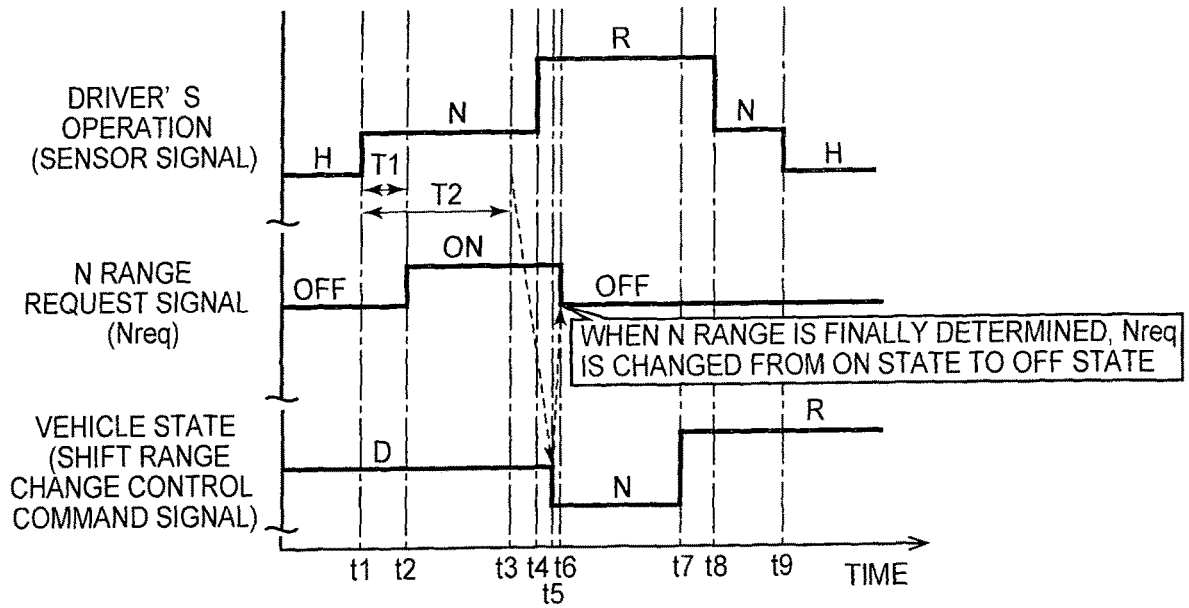
FIG. 11 is a time chart in the case where the control operations shown in the flowchart of FIG. 9 are executed, and is an example of the case where the shift lever is operated to the R operation position.
Figure 12:
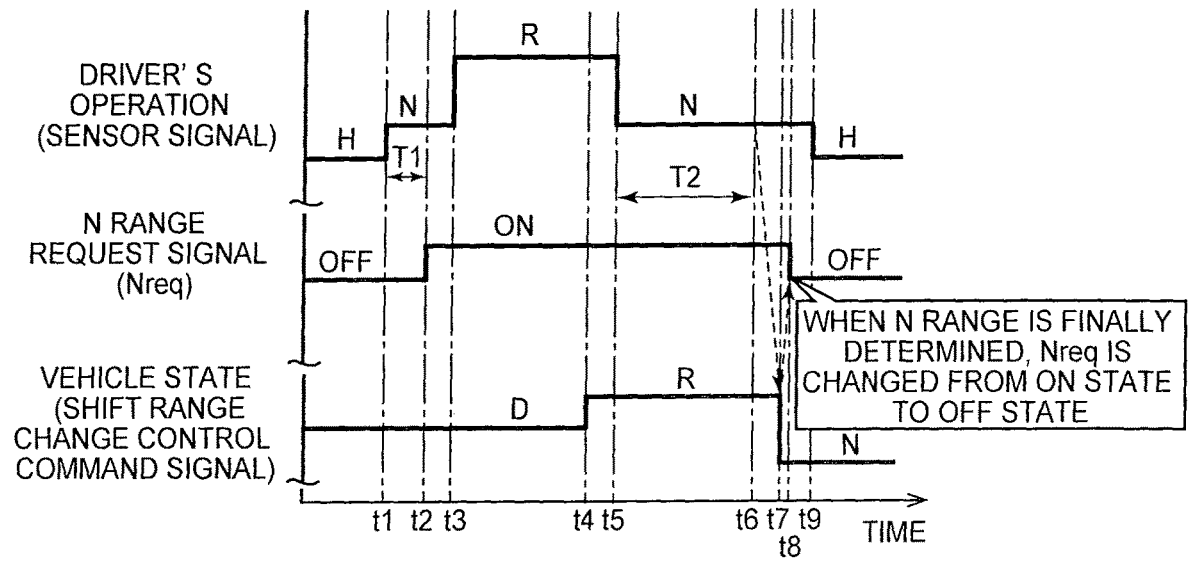
FIG. 12 is a time chart in the case where the control operations shown in the flowchart of FIG. 9 are executed, and is another example of the case where the shift lever is operated to the R operation position, different from the example of FIG. 11.

FIG. 9 is a flowchart that illustrates control operations of the electronic control unit 80, and is, for example, repeatedly executed at an extremely short cycle time of about several milliseconds to several tens of milliseconds. The control operations of the electronic control unit 80 are control operations for further improving the controllability of a change into the N range. The control operations shown in the flowchart of FIG. 9 are executed in parallel with the control operations shown in the flowchart of FIG. 5. FIG. 10, FIG. 11 and FIG. 12 are examples of the time chart in the case where the control operations shown in the flowchart of FIG. 9 are executed.

As shown in FIG. 9, initially, in S210 corresponding to the operation position determination unit 82, for example, it is determined whether there is a change from the H position or any one of the traveling operation positions (R and D operation positions) to the N operation position. When negative determination is made in S210, the routine is ended. On the other hand, when affirmative determination is made in S210 (see t1 timing in FIG. 10, t1 timing and t8 timing in FIG. 11, and t1 timing and t5 timing in FIG. 12), for example, a time during which the N operation signal Npos has been continuously output is counted up in S220 corresponding to the operation position determination unit 82. Subsequently, in S230 corresponding to the operation position determination unit 82, for example, it is determined whether the N operation signal Npos has been continuously output for the second predetermined time T2 or longer (see from t1 timing in FIG. 10, from t1 timing and t8 timing in FIG. 11, and from t1 timing and t5 timing in FIG. 12). When negative determination is made in S230, for example, it is determined in S240 corresponding to the operation position determination unit 82 whether the shift lever 32 has been continuously held at the N operation position. When negative determination is made in S240, the routine is ended. On the other hand, when affirmative determination is made in S240, the process is returned to S220. When affirmative determination is made in S230 (see t3 timing in FIG. 10, t3 timing in FIG. 11, and t6 timing in FIG. 12), for example, the N range is finally determined as the shift range of the automatic transmission 18 in S250 corresponding to the shift range change control unit 86 (see t4 timing in FIG. 10, t5 timing in FIG. 11, and t7 timing in FIG. 12). Subsequently, in S260 corresponding to the change request setting unit 84, for example, the range change request signal Nreq that has been in the on state because of the fact that the N operation signal Npos has been continuously output for the first predetermined time T1 or longer is set to the off state (see t5 timing in FIG. 10, t6 timing in FIG. 11, and t8 timing in FIG. 12).

FIG. 10 is an example of the case where the shift lever 32 is not operated to any one of the traveling operation positions (R and D operation positions). FIG. 11 and FIG. 12 are examples of the case where the shift lever 32 is operated to the R operation position. The t3 timing to the t5 timing in FIG. 10, the t3 timing, the t5 timing and the t6 timing in FIG. 11, or the t6 timing to the t8 timing in FIG. 12 are substantially the same timing in each time chart; however, the intervals are provided in order to clearly indicate the time sequence. The dashed-line arrows in FIG. 10, FIG. 11 and FIG. 12 sequentially indicate the time sequence. A vehicle state in FIG. 10, FIG. 11 and FIG. 12, as well as that of FIG. 6, FIG. 7 and FIG. 8, indicates a controlled state of the shift range (shift range change control command signal Srange).

In FIG. 10, as shown at t3 timing, because of the fact that the shift lever 32 has been continuously held at the N operation position for the second predetermined time T2 or longer, the shift range of the automatic transmission 18 is changed from the D range to the N range and the N range is finally determined at t4 timing, and the range change request signal Nreq is set to the off state at t5 timing after the final determination of the N range. In FIG. 11, as shown at t3 timing, because of the fact that the shift lever 32 has been continuously held at the N operation position for the second predetermined time T2 or longer, the shift range of the automatic transmission 18 is changed from the D range to the N range and the N range is finally determined at t5 timing, and the range change request signal Nreq is set to the off state at t6 timing after the final determination of the N range. After that, as shown at t7 timing, the shift range is quickly changed to the R range. In FIG. 12, as shown at t6 timing, because of the fact that the shift lever 32 has been continuously held at the N operation position for the second predetermined time T2 or longer via the R operation position, the shift range of the automatic transmission 18 is changed from the R range to the N range and the N range is finally determined at t7 timing, and the range change request signal Nreq is set to the off state at t8 timing after the final determination of the N range.

As described above, according to the present embodiment, in addition to similar advantageous effects to those of the above-described first embodiment, when the shift lever 32 has been continuously held at the N operation position for the second predetermined time T2 or longer while the shift lever 32 is kept at the N operation position, the shift range change control unit 86 is allowed to change the shift range to the N range on the assumption that the driver has an intention to change into the N range.

In the above-described first and second embodiments, the operation device 30 is configured such that the shift lever 32 is operated in the h-shaped shift gate. Instead, an operation device in which the shift lever 32 is operated in any one of shift gates shown in FIG. 13 to FIG. 18, other than the h-shaped shift gate, may be used. The operation devices shown in FIG. 13 to FIG. 18 each are a momentary-type operation device as well as the operation device 30, in which an operator (shift lever 32) returns to the initial position in a state where no external force is applied.

Figure 13:
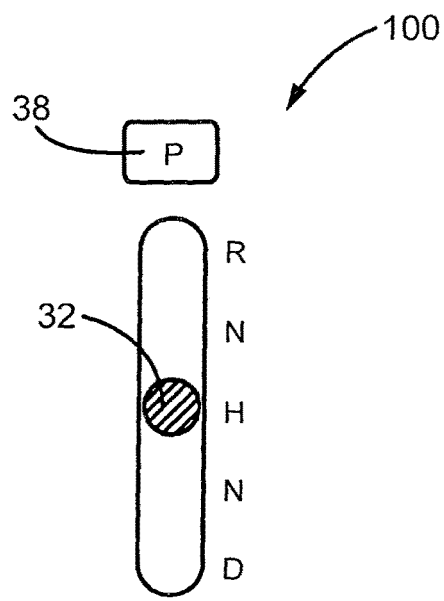
FIG. 13 is a view that shows an example of the momentary-type operation device, in which a shift lever is operated in a straight shift gate.

FIG. 13 is a view that shows an example of a momentary-type operation device 100 in which the shift lever 32 is operated in a straight shift gate. As shown in FIG. 13, the shift lever 32 is operable into each of R operation position, N operation position, H position, N operation position and D operation position arranged sequentially in a straight line. The shift lever 32 is selectively operated by the driver from the H position to any one of the traveling operation positions (R and D operation positions) via the N operation position.

Figure 14:
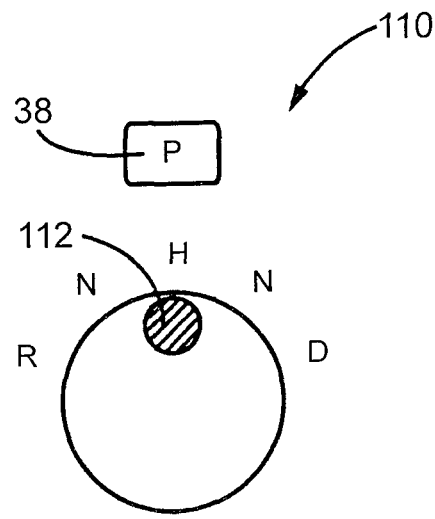
FIG. 14 is a view that shows an example of the momentary-type operation device, in which a dial operator is operated.

FIG. 14 is a view that shows an example of a momentary-type operation device 110 in which a dial operator 112 is operated. As shown in FIG. 14, the operator 112 has a dial shape, and is operated into each of R operation position, N operation position, H position, N operation position and D operation position sequentially in the circumferential direction of the dial shape. The operator 112 is selectively operated by the driver from the H position to any one of the traveling operation positions (R and D operation positions) via the N operation position.

Figure 15:
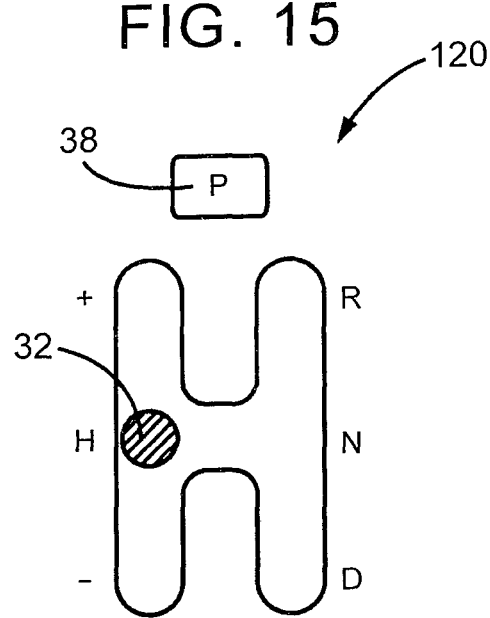
FIG. 15 is a view that shows an example of the momentary-type operation device, in which the shift lever is operated in an H-shaped shift gate.

FIG. 15 is a view that shows an example of a momentary-type operation device 120 in which the shift lever 32 is operated in an H-shaped shift gate. As shown in FIG. 15, the shift lever 32 is operable into each of R operation position, N operation position, D operation position, acceleration operation position (+), H position and deceleration operation position (−). The R operation position, the N operation position and the D operation position are sequentially arranged in a straight line. The acceleration operation position (+), the H position and the deceleration operation position (−) are arranged parallel to the R operation position, the N operation position and the D operation position. The shift lever 32 is selectively operated by the driver from the H position to any one of the traveling operation positions (R and D operation positions) via the N operation position. The acceleration operation position (+) or the deceleration operation position (−) is, for example, an operation position that corresponds to a manual shift range for shifting the automatic transmission 18 through driver's operation.

Figure 16:
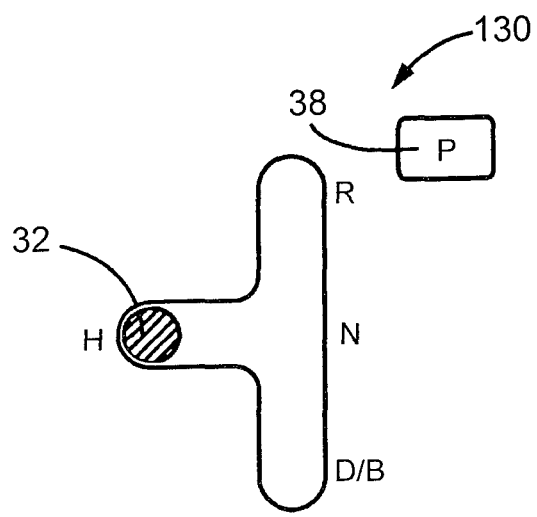
FIG. 16 is a view that shows an example of the momentary-type operation device, in which the shift lever is operated in a T-shaped shift gate.

FIG. 16 is a view that shows an example of a momentary-type operation device 130 in which the shift lever 32 is operated in a T-shaped shift gate. As shown in FIG. 16, the shift lever 32 is operable into each of R operation position, N operation position, D/B operation position and H position. The R operation position, the N operation position and the D/B operation position are arranged sequentially in a straight line. The H position is arranged so as to be connected to the N operation position. The shift lever 32 is selectively operated by the driver from the H position to any one of the traveling operation positions (R and D/B operation positions) via the N operation position. When the shift lever 32 is operated into the D/B operation position, the shift range is changed between the D range and the B range each time the shift lever 32 is operated into the D/B operation position.

Figure 17:
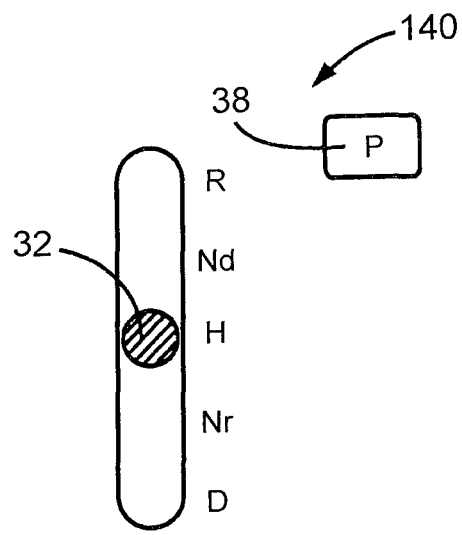
FIG. 17 is a view that shows an example of the momentary-type operation device, in which the shift lever is operation in a straight shift gate, and is another embodiment different from FIG. 13.

FIG. 17 is a view that shows an example of a momentary-type operation device 140 in which the shift lever 32 is operated in a straight shift gate. As shown in FIG. 17, the shift lever 32 is operable into each of R operation position, Nd operation position, H position, Nr operation position and D operation position arranged sequentially in a straight line. The shift lever 32 is selectively operated by the driver from the H position to the R operation position via the Nd operation position, and is selectively operated by the driver from the H position to the D operation position via the Nr operation position. The Nd operation position and the Nr operation position basically have a similar function to that of the N operation position in FIG. 13. However, the Nd operation position has the function of passing through the N operation position when the shift range is the D range, and the Nr operation position has the function of passing through the N operation position when the shift range is the R range.

Figure 18:
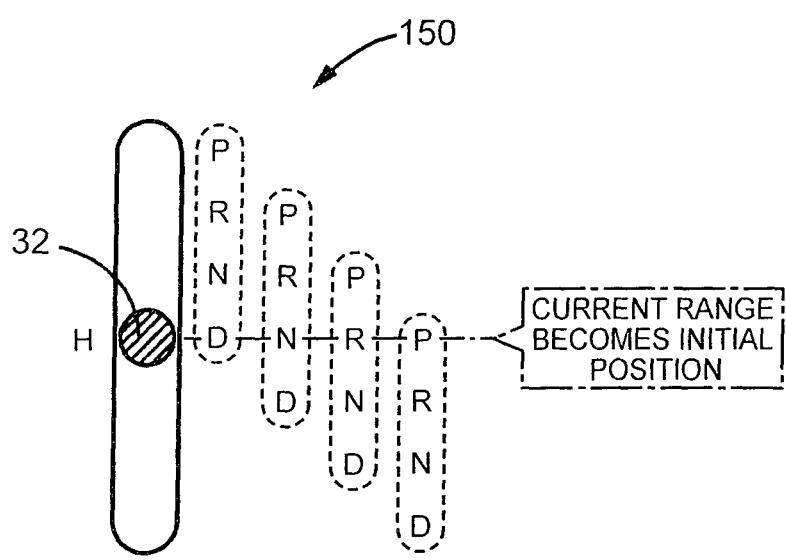
FIG. 18 is a view that shows an example of the momentary-type operation device, in which the shift lever is operated in a straight shift gate, and is another embodiment different from FIG. 13.

FIG. 18 is a view that shows an example of a momentary-type operation device 150 in which the shift lever 32 is operated in a straight shift gate. As shown in FIG. 18, the shift lever 32 is operated into each of the operation positions arranged sequentially in a straight line. In the operation device 150, the current shift range becomes H position, and is arranged in order of P operation position, R operation position, N operation position and D operation position. The shift lever 32 is operable into each of the operation positions arranged sequentially in a straight line. In the operation device 150, when the shift lever 32 is operated in order to change the shift range between the R range and the D range (when D or R is set to the H position), the shift lever 32 is selectively operated by the driver from the H position to any one of the traveling operation positions (R and D operation positions) via the N operation position.

The embodiments of the invention are described in detail above. The invention may be applied to other embodiments.

For example, in the time charts of FIG. 7, FIG. 11 and FIG. 12 according to the above-described embodiments, the case where the shift lever 32 is operated into the R operation position at the time when the shift range is the D range is illustrated. The same applies to the case where the shift lever 32 is operated into the D operation position at the time when the shift range is the R range.

In the above-described embodiments, the operation device 30 includes the shift lever 32 and the P switch 38. However, the operation device 30 is not limited to this configuration. For example, the operation device 30 just needs to be an operation device that converts a driver's shift intention to an electrical signal. Specifically, the operation device 30 just needs to be an operation device that includes operation positions, an operator and a position sensor. The operation positions include P, R, N, D operation positions, and the like, corresponding to the shift ranges. The operator is a lever, a dial, or the like, that is operated into each of the operation positions. The position sensor electrically detects that the operator has been operated into each of the operation positions. Each of the operation devices 30, 100, 110, 120, 130, 140, 150 may be an operation device corresponding to a so-called floor shift-type operation system in which the shift lever 32 (or operator 112) is installed on a floor lateral to a driver seat. Each of the operation devices 30, 100, 110, 120, 130, 140, 150 may be an operation device corresponding to a so-called column shift-type operation system in which the shift lever 32 is installed laterally to a steering wheel. Each of the operation devices 30, 100, 110, 120, 130, 140, 150 may be an operation device, or the like, that employs the shift lever 32 (or the operator 112) installed in an instrument panel.

In the above-described embodiments, an example in which the invention is applied to the change mechanism 16 that selectively changes between the P range (the parking lock position, the locked state) and one non-P range (the non-parking lock position, the non-locked state) in interlocking with the pivotal motion of the detent plate 58 is described. However, the change mechanism 16 is not limited to this configuration. For example, the invention may be applied to a change mechanism that selectively changes among the locked state and the plurality of non-locked states in correspondence with the shift ranges, such as the P, R, N and D ranges.

In the embodiments of the invention, the automatic transmission may be formed of a transmission only, or is formed of a torque converter and a transmission having a plurality of speed ratios, or is formed of a speed reduction mechanism and a differential mechanism in addition to the transmission, or the like. The transmission may be a known planetary gear automatic transmission, a known synchromesh parallel-two-shaft transmission, a known dual clutch transmission (DCT), a known belt-type continuously variable transmission, a known traction-type continuously variable transmission, an automatic transmission that functions as an electrical continuously variable transmission, an automatic transmission that is mounted on a so-called parallel hybrid vehicle, or the like. The electrical continuously variable transmission includes a differential mechanism and a second electric motor. The differential mechanism is, for example, formed of a planetary gear train that splits power from an engine between a first electric motor and an output shaft. The second electric motor is provided on the output shaft of the differential mechanism. The speed ratio of the electrical continuously variable transmission is electrically changed so that a major part of power from the engine is mechanically transmitted toward drive wheels through differential action of the differential mechanism, and the remaining part of power from the engine is electrically transmitted from the first electric motor to the second electric motor with the use of an electrical path. In the parallel hybrid vehicle, an electric motor is provided so as to be able to transmit power to an engine shaft, an output shaft, or the like.

In the aspect of the invention, for example, in process of such an operation of the operator that the operator is operated from the initial position to the neutral operation position and then returned to the initial position without passing through any one of the traveling operation positions, when the operator has been continuously held at the neutral operation position for the second predetermined time or longer, it is possible to quickly change the shift range to the neutral range not at the time when the operator has been returned to the initial position but at the time when the operator is kept at the neutral operation position on the assumption that the driver has an intention to change into the neutral range. In process of such an operation of the operator that the operator is operated from the initial position to the neutral operation position and then passes through any one of the traveling operation positions, when the operator has been continuously held at the neutral operation position for the second predetermined time or longer, it is possible to change the shift range to the neutral range in advance of a change into any one of the traveling ranges corresponding to the traveling operation positions at the time when the operator is kept at the neutral operation position on the assumption that the driver has an intention to change into the neutral range. In process of such an operation of the operator that, after the shift range has been changed into any one of the traveling ranges corresponding to the traveling operation positions, the operator is changed from the any one of the traveling operation positions to the neutral operation position and then returned to the initial position, when the operator has been continuously held at the neutral operation position for the second predetermined time or longer, although there is a history that the operator has passed through any one of the traveling operation positions, it is possible to change the shift range to the neutral range when the operator is kept at the neutral operation position on the assumption that the driver has an intention to change into the neutral range.

The above-described embodiments are only illustrative, and the invention may be implemented in modes including various modifications or improvements on the basis of the knowledge of persons skilled in the art.

What is claimed is:

1. A control system for a vehicle, the control system comprising:
    an automatic transmission;
    an operation device including an operator, the operator being a momentary operator that is returned to an initial position in a state where no external force is applied, the operator being configured to be selectively operated by a driver from the initial position to any one of a plurality of traveling operation positions via a neutral operation position, the neutral operation position corresponding to a neutral range of the automatic transmission, the plurality of traveling operation positions corresponding to a plurality of traveling ranges of the automatic transmission; and
    an electronic control unit configured to
    (1) change a shift range of the automatic transmission based on the initial position, the neutral operation position and the traveling operation positions,
    (2) when the operator is operated from the initial position to the neutral operation position and then returned to the initial position, change the shift range to the neutral range,
    (3) when the operator does not pass through any one of the traveling operation positions while (i) the operator is operated from the initial position to the neutral operation position and then (ii) the operator is returned to the initial position, and when the operator is continuously held at the neutral operation position for a first predetermined time or longer, change the shift range to the neutral range, and
    (4) when the operator passes through at least one of the traveling operation positions while (i) the operator is operated from the initial position to the neutral operation position and then (ii) the operator is returned to the initial position, prohibit a change of the shift range to the neutral range even when the operator is continuously held at the neutral operation position for the first predetermined time or longer.

2. The control system according to claim 1, wherein the electronic control unit is configured to
    (I) when the operator is continuously held at the neutral operation position for the first predetermined time or longer, enable a request to change into the neutral range, and
    (II) when the request to change into the neutral range is enabled at the time when the operator is returned from the neutral operation position to the initial position, and when the operator does not pass through any one of the traveling operation positions while the operator is operated from the initial position to the neutral operation position and then returned to the initial position, change the shift range to the neutral range.

3. The control system according to claim 1, wherein the electronic control unit is configured to, when the operator is continuously held at the neutral operation position for a second predetermined time or longer, change the shift range to the neutral range irrespective of whether or not the operator is returned to the initial position, and
    the second predetermined time is longer than the first predetermined time.

* * * * *